(12) United States Patent
Mozingo et al.

(10) Patent No.: US 7,686,097 B2
(45) Date of Patent: Mar. 30, 2010

(54) THREE POINT HITCH FRAME, DRAFT ARM AND REAR COUNTERWEIGHT DESIGN

(75) Inventors: Robert E. Mozingo, Burlington, IA (US); Ralph D. Galloway, Burlington, IA (US); Marvin L. Linder, Carman, IL (US)

(73) Assignee: CNH America LLC, New Holland, PA (US)

( * ) Notice: Subject to any disclaimer, the term of this patent is extended or adjusted under 35 U.S.C. 154(b) by 42 days.

(21) Appl. No.: 11/742,164

(22) Filed: Apr. 30, 2007

(65) Prior Publication Data

US 2007/0209810 A1 Sep. 13, 2007

Related U.S. Application Data

(63) Continuation-in-part of application No. 11/217,631, filed on Aug. 31, 2005, now Pat. No. 7,377,330.

(51) Int. Cl.
*A01B 59/043* (2006.01)
(52) U.S. Cl. .................. 172/450; 172/611; 280/455.1
(58) Field of Classification Search .............. 172/272, 172/439, 443, 444, 445.2, 446, 447, 449, 172/450, 611; 280/455.1, 456.1, 474
See application file for complete search history.

(56) References Cited

U.S. PATENT DOCUMENTS

| | | | | |
|---|---|---|---|---|
| 2,453,390 A | * | 11/1948 | Werner | 172/450 |
| 2,565,337 A | | 8/1951 | Allan | |
| 2,746,770 A | | 5/1956 | Sorensen et al. | |
| 2,869,654 A | | 1/1959 | Hershman | |
| 2,935,145 A | | 5/1960 | Shane et al. | |
| 2,935,147 A | * | 5/1960 | Edman et al. | 172/457 |
| 3,038,545 A | | 6/1962 | Read | |
| 3,062,563 A | | 11/1962 | Pearce | |
| 3,074,501 A | | 1/1963 | Lane et al. | |
| 3,502,351 A | | 3/1970 | Gray | |

(Continued)

FOREIGN PATENT DOCUMENTS

DE    4238583 A1    11/1992

(Continued)

*Primary Examiner*—Thomas B Will
*Assistant Examiner*—Joel F Mitchell
(74) *Attorney, Agent, or Firm*—Patrick M. Sheldrake; John William Stader; Michael G. Harms

(57) ABSTRACT

A three point hitch for a work machine includes a first and a second draft link each having a mounting end portion and a free end portion opposite the mounting end portion. Mounting end portion being mounted to a first side of a work machine to allow upward and downward pivotal movement of the free end portion beside an upwardly and downwardly extending fixed structural element of the work machine. Mounting end portion of the second draft link being mounted to a second side of the work machine opposite the first side to allow upward and downward pivotal movement of the free end portion of the second draft link. A sway restrictor mounts on the free end portion of the first draft link and restricts sideward swaying thereof toward and away from the structural element. A counterweight for use with the three point hitch is interchangeable with a fluid motor.

18 Claims, 11 Drawing Sheets

U.S. PATENT DOCUMENTS

| | | | |
|---|---|---|---|
| 3,572,759 A | 3/1971 | Baugh et al. | |
| 3,572,763 A | 3/1971 | Cannon et al. | |
| 3,709,304 A * | 1/1973 | Haupt | 172/450 |
| 3,721,302 A * | 3/1973 | Buchmuller et al. | 172/450 |
| 3,814,188 A | 6/1974 | Ahne | |
| 3,847,228 A | 11/1974 | Slosiarek et al. | |
| 3,888,316 A | 6/1975 | Azzarello et al. | |
| 3,910,355 A * | 10/1975 | Elfes et al. | 172/450 |
| 4,203,613 A | 5/1980 | Kunze | |
| 4,232,883 A * | 11/1980 | Bourgeous et al. | 280/759 |
| 4,265,464 A | 5/1981 | Lange | |
| 4,268,057 A * | 5/1981 | Engelmann et al. | 280/474 |
| 4,601,486 A | 7/1986 | Marcq | |
| 4,640,522 A | 2/1987 | Teich | |
| 4,664,404 A * | 5/1987 | Schultz | 280/461.1 |
| 4,862,971 A * | 9/1989 | Azzarello et al. | 172/450 |
| 4,940,096 A | 7/1990 | Johnson | |
| 5,346,018 A | 9/1994 | Koster | |
| 5,423,394 A | 6/1995 | Kendle | |
| 5,458,100 A | 10/1995 | Neuenfeld | |
| 5,823,268 A | 10/1998 | Barnes | |
| 5,971,082 A | 10/1999 | Satzler | |
| 6,065,549 A | 5/2000 | Schlegel | |
| 6,378,620 B1 | 4/2002 | Luca et al. | |
| 6,588,513 B1 | 7/2003 | Gustafson | |
| 6,769,496 B2 | 8/2004 | Casali et al. | |
| 6,830,110 B2 | 12/2004 | Schlesser et al. | |
| 2003/0015846 A1 | 1/2003 | Rogala et al. | |
| 2003/0047892 A1 | 3/2003 | Goddard | |
| 2004/0215380 A1 | 10/2004 | Song | |

FOREIGN PATENT DOCUMENTS

| | | |
|---|---|---|
| EP | 0355893 A1 | 2/1990 |

* cited by examiner

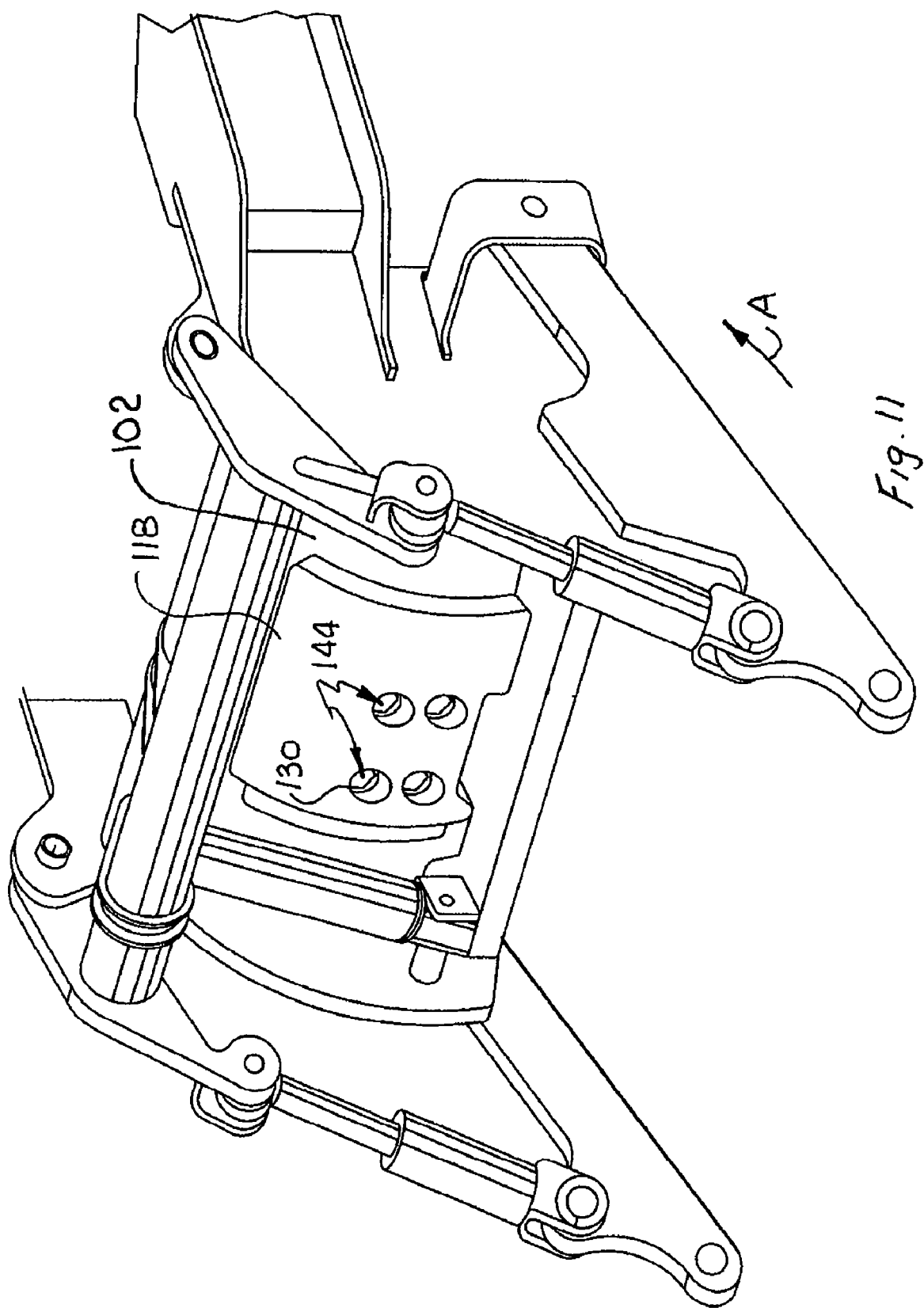

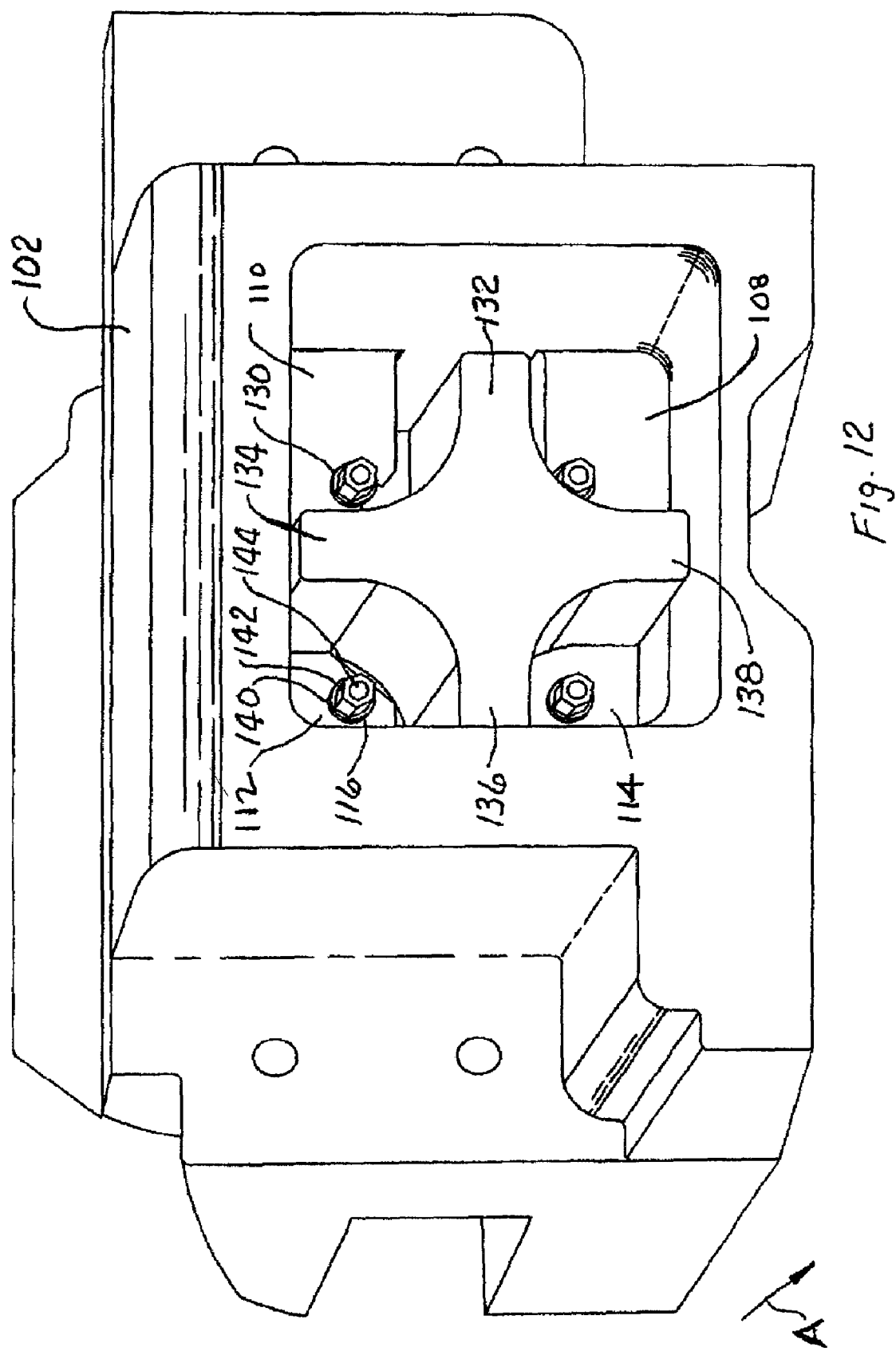

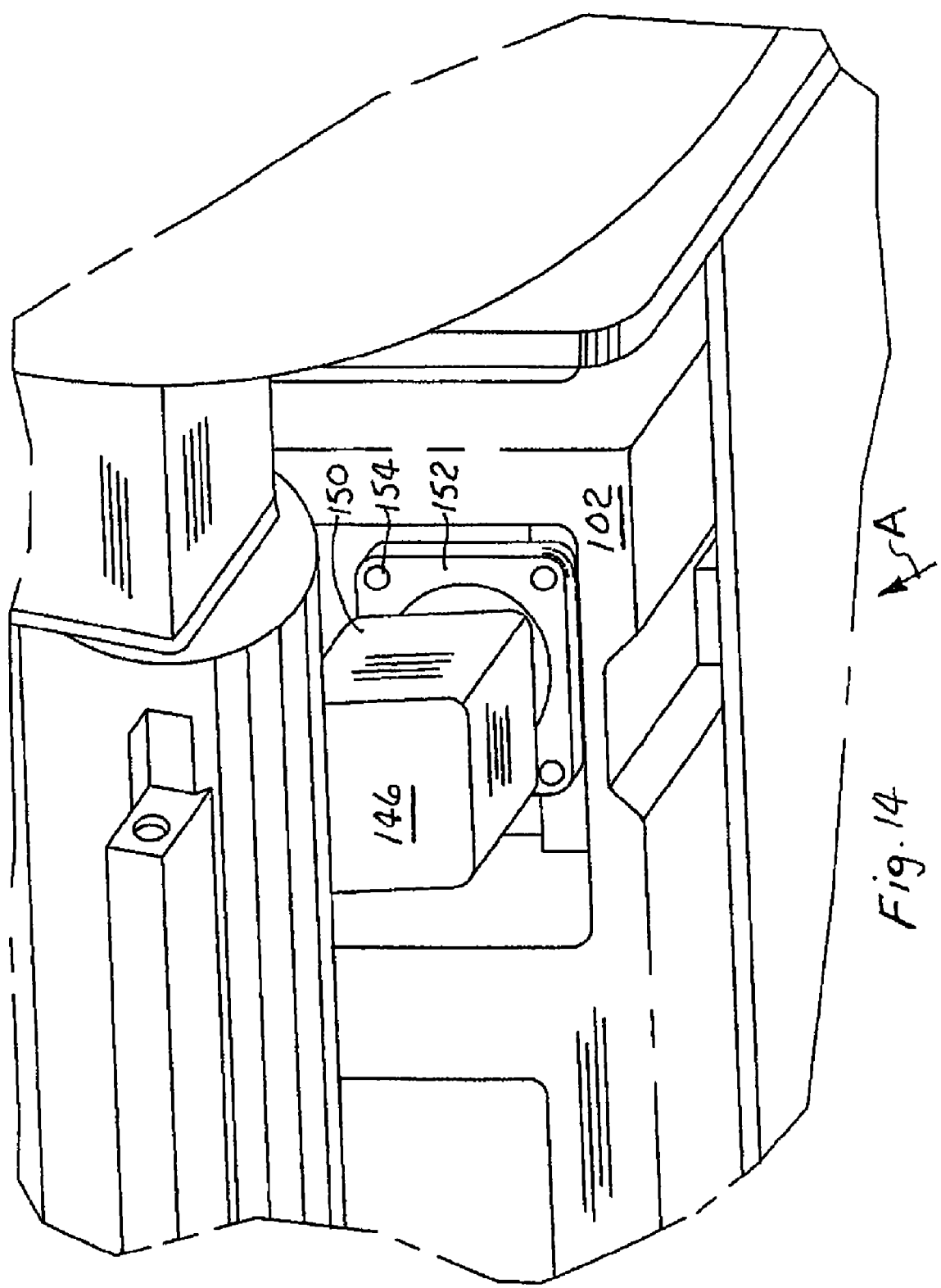

THREE POINT HITCH FRAME, DRAFT ARM AND REAR COUNTERWEIGHT DESIGN

CROSS-REFERENCE TO RELATED APPLICATIONS

This Application is a continuation-in-part of application Ser. No. 11/217,631, filed Aug. 31, 2005 now U.S. Pat. No. 7,377,330.

FIELD OF THE INVENTION

The present invention relates generally to a three point hitch for a work machine such as a tractor used for construction, earth moving, agriculture, and other purposes, and more particularly, to a sway restrictor including a bracket attachable between a draft link or arm and an adjacent upwardly and downwardly extending fixed structural element of a work machine and operable for substantially restricting or preventing relative sideward movement therebetween, particularly swaying of the hitch, while allowing relative upward and downward movements thereof, including tilting movements. The present invention further relates to a counterweight/fluid motor arrangement for use with the three point hitch.

BACKGROUND OF THE INVENTION

Work machines such as tractors often include three point hitches for supporting and towing tools and implements, such as scrapers, blades, sprayers, and the like. For many applications, it is required or desired to have the ability for the towed tool or implement to closely follow a desired or predetermined path, such as an edge or boundary of an area to be scraped, for instance, the edge of a soil area next to a foundation, and where exceeding the boundary is undesirable or can possibly cause damage such as that which could result from contact between a scraper or blade and a foundation or wall. However, such three point hitches typically utilize draft links or arms for supporting and connecting to the lower portions of a tool or implement. The vertical position of the draft links is typically individually precisely controllable using fluid cylinders connected between the draft links and the work machine, but the connections allow generally free relative side to side movements of the draft links and the work machine over a relatively large amount of travel. Some sideward movement is required for hitches for construction and landscaping applications wherein the draft links are individually vertically movable by separate cylinders, so as to effect and facilitate sideward tilting of a scraper or blade. However, such side to side freedom of movement permitted by known hitches also allows swaying of the tool or implement and a resultant difficulty in maintaining precise side to side positioning thereof, for instance, for alignment with an edge or boundary of an area being worked by the tool or implement, such as soil area being landscaped adjacent to a foundation or wall.

To substantially limit or prevent such swaying, it is known to provide blocks which may be mounted in one or more alternative orientations or positions on a work machine or draft link, for preventing sway in one direction only. Such blocks are advantageous as they are relatively compact and allow close spacing between a wheel of a tractor and a draft link, but a disadvantage is that the blocks are required to be used in association with both of the draft links to prevent swaying in both sideward directions. Reference in this regard, Slosiarek et al. U.S. Pat. No. 3,847,228, issued Nov. 12, 1974 to Allis-Chalmers Manufacturing Company; and Teich U.S. Pat. No. 4,640,522, issued Feb. 3, 1987 to Deere & Company. As another disadvantage, a problem that can arise when using such blocks with a sidewardly tiltable hitch is that at least one of the draft links would have to be allowed to move sidewardly to accommodate sideward tilting movement, which would also allow at least some of the sideward swaying not desired for the reasons discussed above.

As an alternative, a variety of single arms and struts have been developed for connection between a structural element of a work machine and one of the draft links of a three point hitch, to provide bi-directional limitation of movements of the draft link, to thereby attempt to eliminate the need for devices such as blocks in association with each of the draft links. Reference in this regard, Kunze U.S. Pat. No. 4,203,613, issued May 20, 1980 to Jean Walterscheid GmbH; and Lang U.S. Pat. No. 4,265,464, issued May 5, 1981 to Deere & Company. However, devices such as these suffer from shortcomings including requirements for multiple pivotal connections, complexity, large size and space requirement, and relatively high cost.

In addition, it is desirable for the draft arms to be adjustable to accommodate category 1, 2 and 3 implements, requiring the draft arms to be capable of varied space therebetween. As a result, some draft arm constructions are joggled, resembling a flattened Z shape, or otherwise curved or non-linear. One consequence is that due to the offset between the ends of the of the non-linear draft arms, torsional loading can result when implements are subjected to side loading or other eccentric loading conditions. To prevent structural failure or bending under these conditions, the draft arms, associated fittings and work vehicle structures must be made more robust, adding weight, size and operating costs.

Further, depending upon the implement used, the work vehicle may also need to be provided rotational power, such as from a rotary motor. Alternately, counterweights may need to be connected to the work vehicle to provide additional ballast for increased traction for the wheels, depending upon the type of type of implement required. Typically, multiple counterweights are required for mounting to different locations of the structural elements of the work vehicle, since size is limited in combination with access requirements for the different moving components of the three point hitch or other components. In addition, the multiple counterweights require special mounting arrangements that are not interchangeable with other components to the work vehicle. Moreover, the counterweights do not contribute to the structural integrity of the structural elements of the work vehicle.

Thus, what is sought is a sway restricting apparatus that facilitates sideward tilting of a hitch, and overcomes one or more of the problems and/or disadvantages set forth above. Additionally, what is sought is a counterweight construction usable with the sway restricting apparatus that can be interchangeably mounted to structural elements of the work vehicle and further contributes to the structural integrity of the structural elements of the work vehicle.

SUMMARY OF THE INVENTION

What is disclosed is a sway restrictor for a draft link of a three point hitch for a work machine such as a tractor with a counterweight and/or rotary motor construction usable with the three point hitch which overcomes one or more of the problems and/or disadvantages set forth above.

The present invention relates to a three point hitch for a work machine including an elongate substantially straight first draft link having a mounting end portion and a free end portion opposite the mounting end portion. The mounting end portion is mounted to a first side of a work machine to allow upward and downward pivotal movement of the free end portion beside an upwardly and downwardly extending fixed structural element of the work machine. An elongate substantially straight second draft link has a mounting end portion and a free end portion opposite the mounting end portion thereof. The mounting end portion of the second draft link is mounted to a second side of the work machine opposite the first side to allow upward and downward pivotal movement of the free end portion of the second draft link. A sway restrictor is mounted on the free end portion of the first draft link and engaged with the upwardly and downwardly extending structural element so as to be movable upwardly and downwardly therealong during the upward and downward pivotal movement of the free end portion of the first draft link while restricting sideward swaying thereof toward and away from the structural element.

The present invention further relates to a work machine including a three point hitch. The three point hitch includes an elongate substantially straight first draft link having a mounting end portion and a free end portion opposite the mounting end portion. The mounting end portion is mounted to a first side of the work machine to allow upward and downward pivotal movement of the free end portion beside an upwardly and downwardly extending fixed structural element of the work machine. An elongate substantially straight second draft link has a mounting end portion and a free end portion opposite the mounting end portion thereof. The mounting end portion of the second draft link is mounted to a second side of the work machine opposite the first side to allow upward and downward pivotal movement of the free end portion of the second draft link. A sway restrictor is mounted on the free end portion of the first draft link and engaged with the upwardly and downwardly extending structural element so as to be movable upwardly and downwardly therealong during the upward and downward pivotal movement of the free end portion of the first draft link while restricting sideward swaying thereof toward and away from the structural element. A structural body is disposed between the upwardly and downwardly extending fixed structural element and the second draft link.

The present invention still further relates to a work machine including a three point hitch. The three point hitch includes an elongate substantially straight first draft link having a mounting end portion and a free end portion opposite the mounting end portion. The mounting end portion is mounted to a first side of the work machine to allow upward and downward pivotal movement of the free end portion beside an upwardly and downwardly extending fixed structural element of the work machine. An elongate substantially straight second draft link has a mounting end portion and a free end portion opposite the mounting end portion thereof. The mounting end portion of the second draft link is mounted to a second side of the work machine opposite the first side to allow upward and downward pivotal movement of the free end portion of the second draft link. A sway restrictor is mounted on the free end portion of the first draft link and engaged with the upwardly and downwardly extending structural element so as to be movable upwardly and downwardly therealong during the upward and downward pivotal movement of the free end portion of the first draft link while restricting sideward swaying thereof toward and away from the structural element. A structural body is disposed between the upwardly and downwardly extending fixed structural element and the second draft link. The structural body is configured to interchangeably receive one of a counterweight and a rotary motor to drive an implement.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 11 is a partial perspective view of a rear end of a work machine representative of a tractor with a counterweight installed in a recess of the structural body of FIGS. 9 and 10 of the present invention.

FIG. 12 is an enlarged partial perspective view, reversed from FIG. 11, showing a counterweight of FIGS. 9 and 10 installed in the structural body of the present invention.

FIG. 14 is an enlarged partial perspective view, reversed from FIG. 13, showing a rotary motor of FIG. 13 installed in the structural body of the present invention.

Wherever possible, the same reference numbers will be used throughout the drawings to refer to the same or like parts.

DETAILED DESCRIPTION OF THE INVENTION

Figure 1:
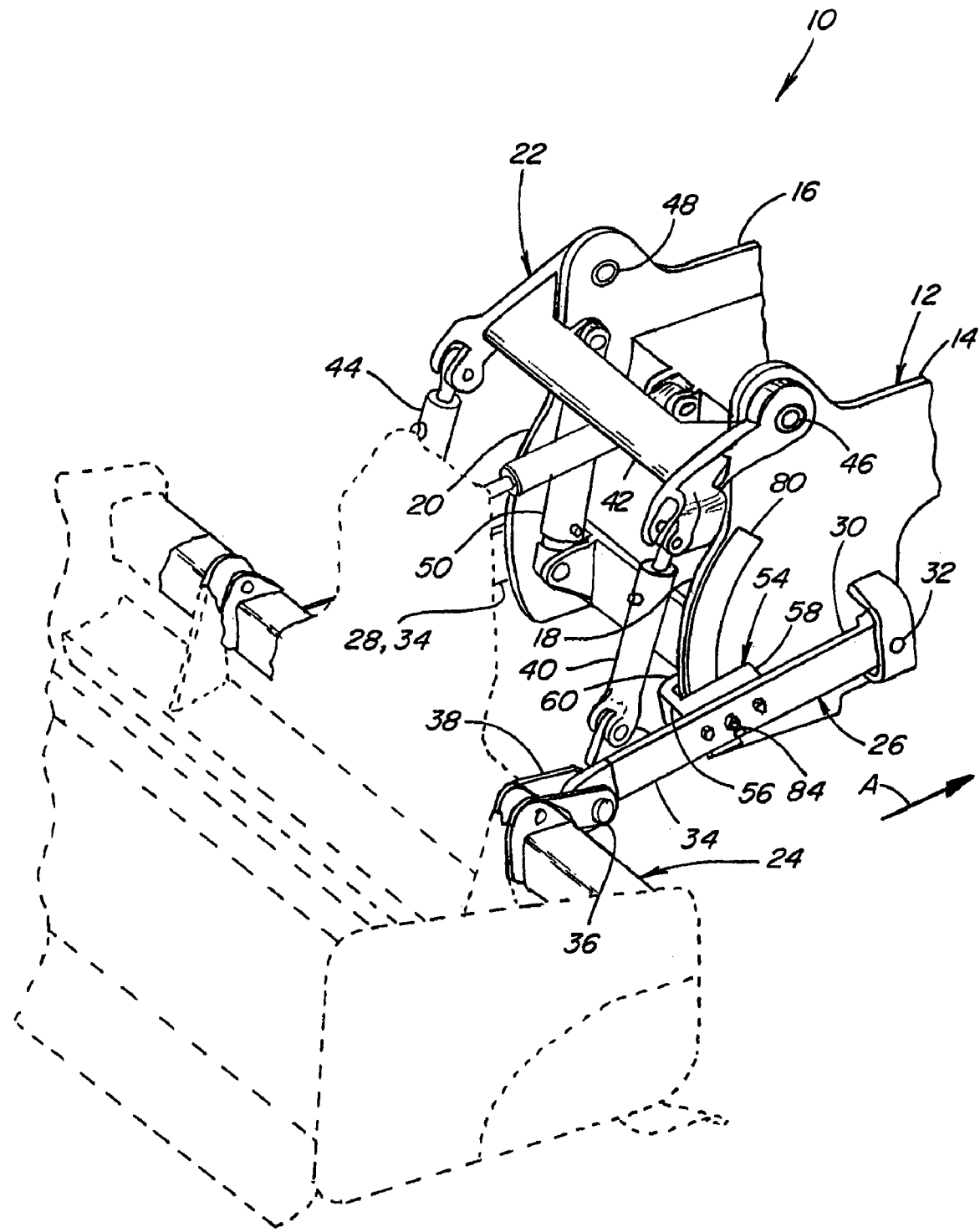
FIG. 1 is a partial perspective view of a rear end of a work machine representative of a tractor used for construction purposes, including an embodiment of a three point hitch and a sway restrictor of the present invention installed thereon, and showing partially in dotted lines, a conventional soil scraper used for landscaping and the like, mounted on the hitch.

Referring now to the drawings, in FIG. 1, a rear end of a conventional work machine 10 is shown, work machine 10 being intended to be representative of a wide variety of work machines such as a tractor, used for purposes such as construction, landscaping, agriculture, and the like. Work machine 10 includes a rear frame 12, which can be a weldment, casting or other member or structure of heavy-duty construction, including at least one and possibly a pair of spaced apart structural elements 14 and 16, comprising upwardly and downwardly extending side plates including generally arcuate, upwardly and downwardly extending rear edge portions 18 and 20, respectively. Structural elements 14 and 16 support a three point hitch 22, which, in turn, is capable of supporting any of a wide variety of tools and implements, such as a soil scraper 24 shown.

Essentially, in operation, scraper 24 is supported on three point hitch 22 at a desired elevation in relation to the soil, and pulled or towed in a forward direction, denoted here generally by arrow A, for scraping and holding soil for later deposition on the ground. Scrapers, such as scraper 24, are commonly used in landscaping and other construction applications for leveling soil next to structures, such as walls, foundations, and the like, wherein it is desirable to tow the scraper as close as possible to the wall or foundation for working the soil in that area. A scraper such as scraper 24 may also be forwardly or rearwardly tilted for more or less aggressive scraping action, and may be sidewardly tilted to enable forming the sides of ditches, swails, and the like.

Three point hitch 22 generally includes a pair of draft links, including a first draft link 26 and a second draft link 28. Each of the draft links 26 and 28 includes a mounting end portion 30 which is mounted to, or adjacent to, one of the structural elements of rear frame 12, for pivotal upward and downward movement of a free end 34 thereof, as illustrated by pivotal mounting of mounting end portion 30 of first draft link 26 to structural element 14 by pivot pin 32. A tool or implement, here represented by soil scraper 24, is attached to free end portions 34 of draft links 26 and 28, by pins 36 which extend through holes through free end portions 34 and clevises 38 on scraper 24. Free end portion 34 of first draft link 26 is pivotally connected to a lower end of a first tilt cylinder 40, the upper end of cylinder 40 being pivotally connected to one end of a rocker shaft 42. Similarly, free end portion 34 of second draft link 28 is connected to a second tilt cylinder 44 which is also connected to rocker shaft 42. First and second tilt cylinders 40 and 44 are individually extendible for adjusting a vertical pivotal position of the respective free end portions 34, for effecting sideward tilting of the hitch and a tool or implement connected thereto such as scraper 24. Rock shaft 42, in turn, is pivotally connected by pins 46 and 48 to structural elements 14 and 16, respectively, so as to be vertically pivotable in relation thereto, as controlled by a main lift cylinder 50, for adjusting an overall vertical height or elevation of a tool or implement mounted on three point hitch 22, such as soil scraper 24, as desired or required for a particular application. A centrally located center link of the hitch also connects to a center portion of a tool or implement, and is movable by another cylinder to effect forward and rearward tilting of the tool or implement. Also, as an alternative it should be understood that hitch 22 may be equipped with only one tilt cylinder for effecting sideward tilting movements.

Figure 6:
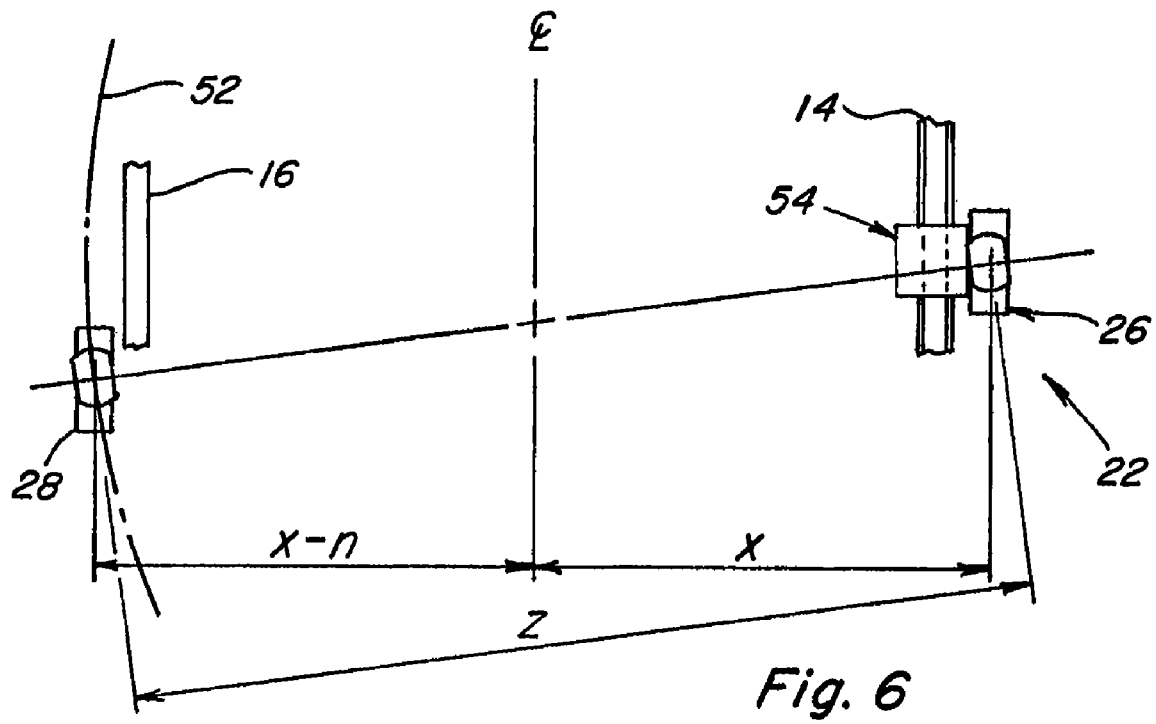
FIG. 6 is another simplified schematic rear view of the hitch and restrictor of the present invention, with the hitch tilted, to show an advantage of the restrictor.

Here, referring also to FIG. 6, it should be understood that when free end portions 34 of draft links 26 and 28 are connected to a tool or implement, such as scraper 24, the sideward spacing between free end portions 34 of the draft links 26 and 28 is substantially fixed, or variable only by a small amount. As a result, when draft links 26 and 28 are positioned at different heights for effecting tilting of a tool or implement, at least one of the draft links must be allowed to move sidewardly relative to the adjacent structural element. This is illustrated by arcuate line 52 in FIG. 6.

However, for many applications, for instance, when scraping soil next to a wall or foundation, it is desirable to have the capability for preventing any substantial or significant side-to-side movement or swaying of a scraper such as scraper 24, such that the wall or foundation is not inadvertently contacted or impacted so as to possibly damage the scraper and/or wall or foundation, and such that areas closely adjacent to the wall or foundation are not missed during the scraping operation or path. It is also desirable that any apparatus that provides such capability of preventing or substantially restricting swaying movements of a tool or implement, such as scraper 24, allow the required movement of at least one of the draft links 26 and 28, to allow effecting sideward tilting thereof, without subjecting components of the hitch, work machine, and/or tool or implement, to undue stress or wear. Still further, it is also desirable for any such apparatus to be strong and durable, yet compact and simple in construction.

Figure 2:
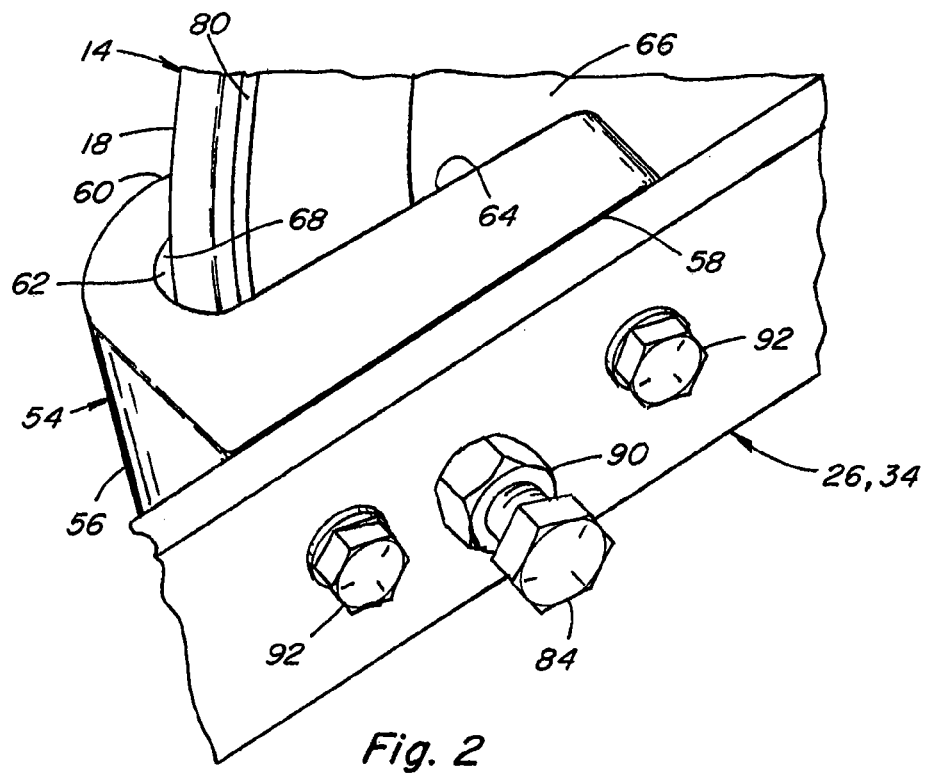
FIG. 2 is an enlarged partial perspective view of a draft link of the three point hitch and sway restrictor of FIG. 1, showing a structural element of the work machine received in a bracket of the sway restrictor of the present invention.
Figure 3:
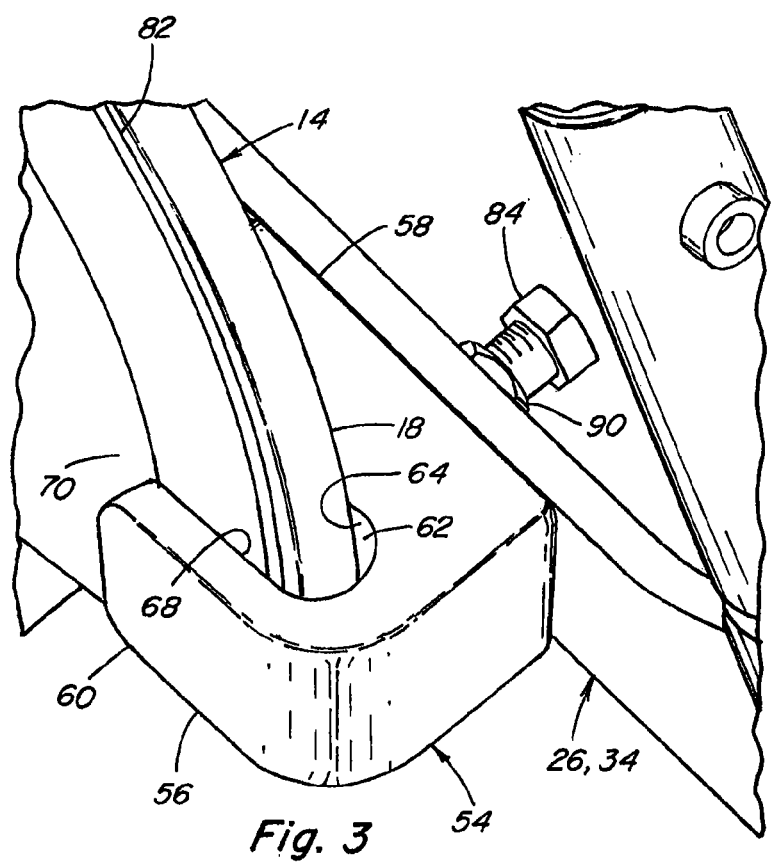
FIG. 3 is another enlarged partial perspective view of the draft link and sway restrictor of the present invention in association with the structural element.
Figure 4:
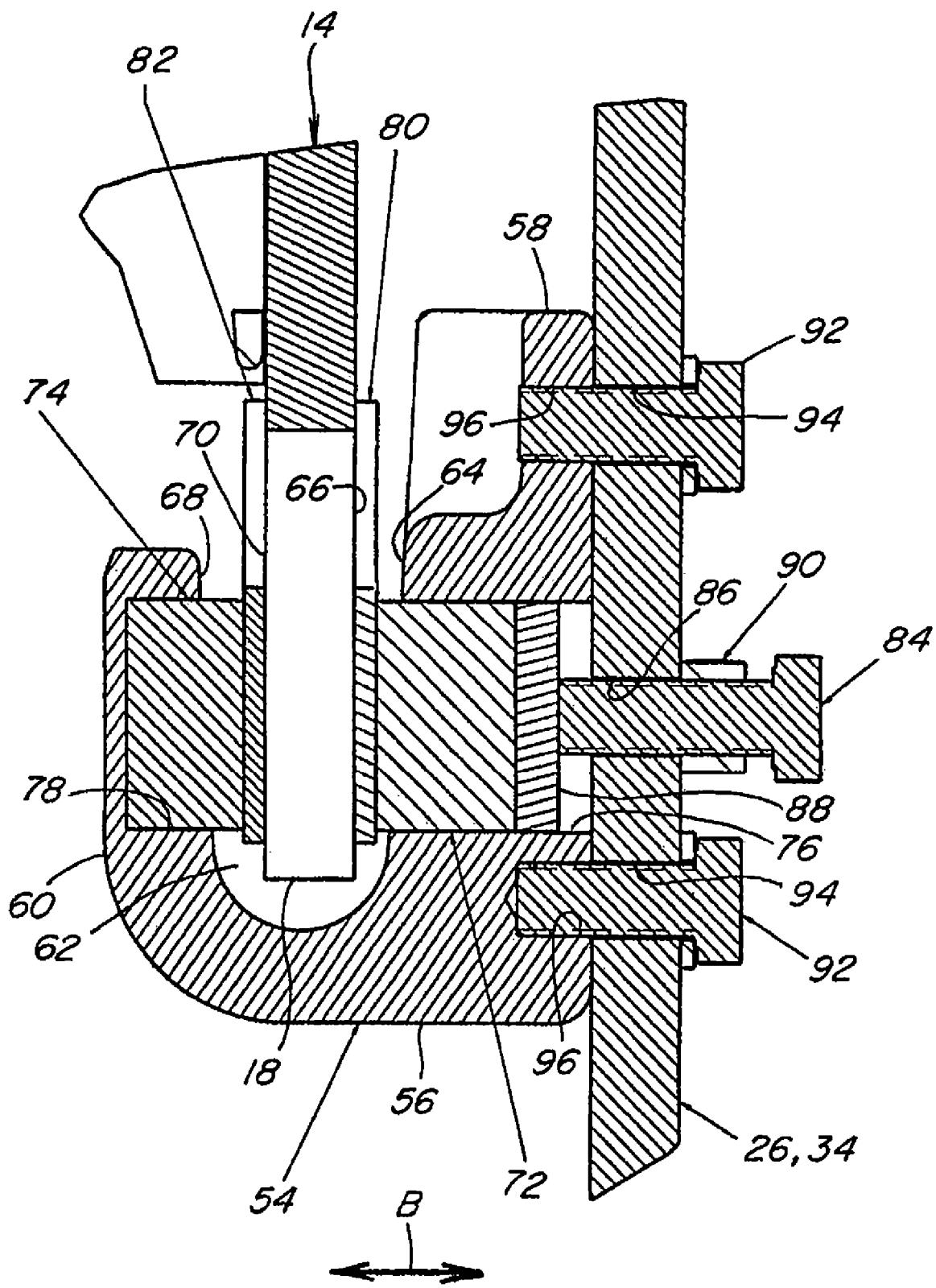
FIG. 4 is a sectional representation of the sway restrictor of the present invention mounted on the draft link and engaged with the structural element of the work machine, illustrating internal aspects of the restrictor.

Referring also to FIGS. 2, 3 and 4, a sway restrictor 54 constructed and operable according to the teachings of the invention, is shown mounted on free end portion 34 of first draft link 26, adjacent to rear edge portion 18 of structural element 14, so as to be capable of moving upwardly and downwardly in relation thereto with the upward and downward movements of free end portion 34 of draft link 26. Sway restrictor 54, as shown in FIGS. 2, 3 and 4, includes a generally C-shaped bracket 56 of suitable heavy duty construction, such as of cast or forged metal. Bracket 56 has a first leg portion 58, and a second leg portion 60 spaced sidewardly from first leg portion 58, defining a space 62 therebetween. In this way, bracket 56 extends or wraps partially around rear edge portion 18 of structural element 14, for limiting the amount of side-to-side relative movement therebetween denoted by arrow B in FIG. 4. Such side-to-side movement B will be generally about perpendicular to the forward direction, as denoted by arrow A in FIG. 1.

With rear edge portion 18 of structural element 14 cooperatively received in space 62, an inner surface 64 of first leg portion 58 will face an outer or first side 66 of structural element 14, and an inner surface 68 of second leg portion 60 will face an opposite second side 70 of structural element 14. As a result, relative side-to-side movements of draft link 26 and structural element 14 will be limited to the amount, if any, that the sideward extent of space 62 is larger than the sideward extent of structural element 14 between sides 66 and 70 thereof. To provide an ability to vary and substantially limit relative sideward movement of structural element 14 and draft link 26, and also to increase the durability of sway restrictor 54, at least one of leg portions 58 and 60, and, in one embodiment, both, include a wear pad positioned to bear against the adjacent side of structural element 14, as illustrated by wear pads 72 and 74 in FIG. 4.

As shown in FIG. 4, wear pad 72 of first leg portion 58 is located in a sidewardly extending passage 76 in and through leg portion 58, so as to extend into space 62 in a position to bear against first side 66 of structural element 14. Similarly, wear pad 74 is disposed in a cavity 78 in inner surface 68 of second leg portion 60 and extends sidewardly into space 62 to bear against second side 70 of structural element 14. As an additional wear reducing feature, as shown in FIGS. 2, 3 and 4, sides 66 and 70 of structural element 14 include elongate, arcuate shape wear plates 80 and 82 thereon, respectively, positioned for contact with wear pads 72 and 74, respectively, along the extent of vertical travel of draft link 26 relative to structural element 14.

As further shown in FIGS. 2, 3 and 4, an adjusting element 84 is provided for adjusting a sideward position or amount of extension of wear pad 72 into space 62. In one embodiment, adjusting element 84 comprises a threaded member threadedly received in a threaded hole 86 through draft link 26, and bears against a backing plate 88 disposed between wear pad 72 and adjusting element 84. A locking nut 90 is threadedly engaged with adjusting element 84 and can be brought to bear against draft link 26 for holding adjusting element 84 and wear pad 72 in a desired position. Here, referring particularly to FIG. 4, it can be observed that virtually no space or gap exists between wear pad 72 and plate 80, and wear pad 74 and plate 82, such that little or no sideward swaying of draft link 26 will be allowed, while vertical relative movement through the anticipated range of vertical positions of draft link 26 will be allowed, as generally illustrated in FIG. 1 by the upward extent of wear plate 80 above draft link 26. However, as desired by the equipment operator, a predetermined space or gap can be maintained. Suitable materials of construction of wear pads 72 and 74 can include, but are not limited to, well known, commercially available glass filled plastics, lubricant impregnated metallic materials, and sintered materials, it being recognized that other materials, such as low friction ceramics, and the like, can also be used. In one embodiment, plates 80 and 82 are constructed of steel, although other suitable materials can also be used.

It is to be understood that while one embodiment of adjustment element 84 as shown in FIGS. 2, 3 and 4 is a threaded member, other suitable constructions are contemplated to effect a similar result. For example, the adjustment element can operate by use of fluid pressure, mechanical linkage or electronically actuated device, or any combination thereof capable of maintaining a gap or space or reducing to virtually no space or gap between wear pad 72 and plate 80, and wear pad 74 and plate 82, or similar construction, to permit selective control of draft link 26 with little or virtually no sideward swaying of the draft link.

Sway restrictor 54 is suitably mounted in connection with draft link 26, here, by a pair of bolts 92 which pass through holes 94 through draft link 26 and are threadedly received in threaded holes 96 in first leg portion 58 of bracket 56. Other means of attachment, including by welding, and also other methods, such as casting or otherwise forming in place, and the like, can also be used.

Figure 5:
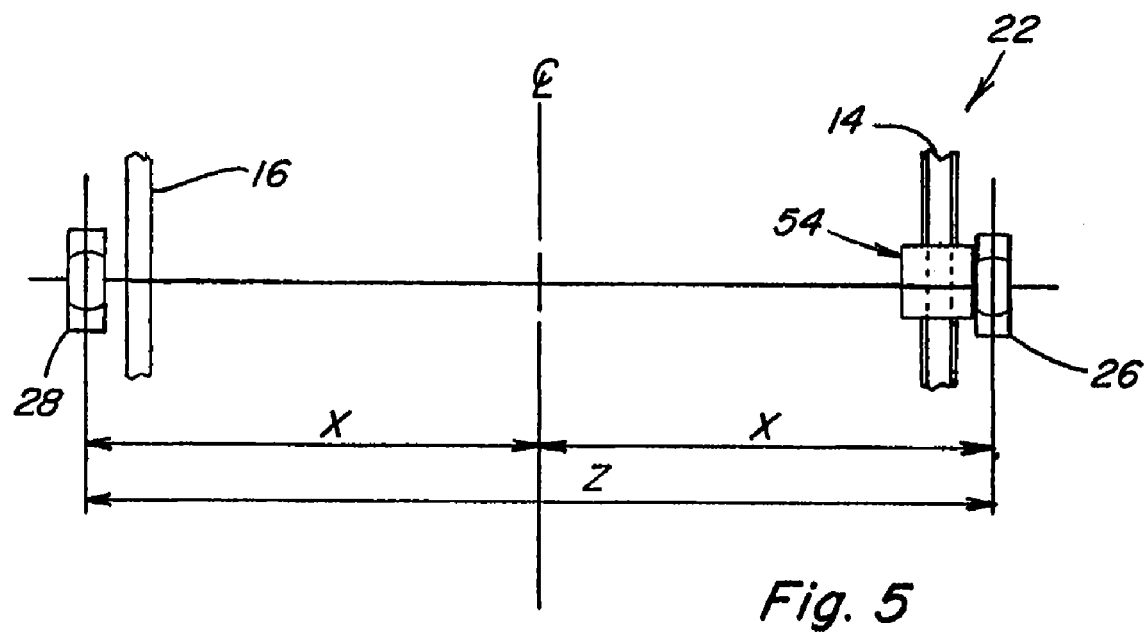
FIG. 5 is a simplified schematic rear view of the hitch and restrictor of the present invention, with the hitch in a horizontal, non-tilted orientation.

Turning also to FIGS. 5 and 6, in FIG. 5, draft links 26 and 28 of three point hitch 22 are shown in a generally horizontal configuration beside structural elements 14 and 16, respectively. In this view, it can be observed that the centers of each of draft links 26 and 28 are located a distance X from a center line of the work machine on which the hitch is mounted. Distance X is shown here also being equal to a distance Z between centers of the draft links at their points of attachment to the scraper or other implement or tool, as held constant by such attachment. Sway restrictor 54 of the invention is shown mounted on draft link 26 and in cooperative engagement with structural element 14. In FIG. 6, hitch 22 is shown sidewardly tilted such that draft link 28 has been lowered below draft link 26. It can be observed here that sway restrictor 54 has maintained draft link 26 at distance X from the center line, whereas lowered draft link 28 has followed an arcuate line 52 so as to now be a distance X-n from the center line. Distance Z remains constant. As a result, it should be apparent that using sway restrictor 54, draft link 26 is able to move upwardly and downwardly along a straight line to thereby prevent any substantial sideward swaying thereof, and also of a tool or implement such as scraper 24 (FIG. 1) mounted thereon, while draft link 28 is permitted to move sidewardly as required to accommodate tilting movements such as that illustrated in FIG. 6.

Here, it should be appreciated that such sway restricting capabilities are accomplished with a sway restrictor illustrated by restrictor 54, which is of robust, strong construction, yet which is relatively compact and simple, particularly to set up and adjust. Additionally, it should be appreciated that a sway restrictor of the invention, such as sway restrictor 54, can be utilized with a draft link on either side of a three point hitch, and has utility for hitches located on both the front and rear of a work machine such as a tractor or the like. Still further, adjustments, for instance, to compensate for wear of the wear pads, or for setting a desired amount of permitted sway, are easily and simply accomplished, utilizing adjusting element 84.

Figure 7:
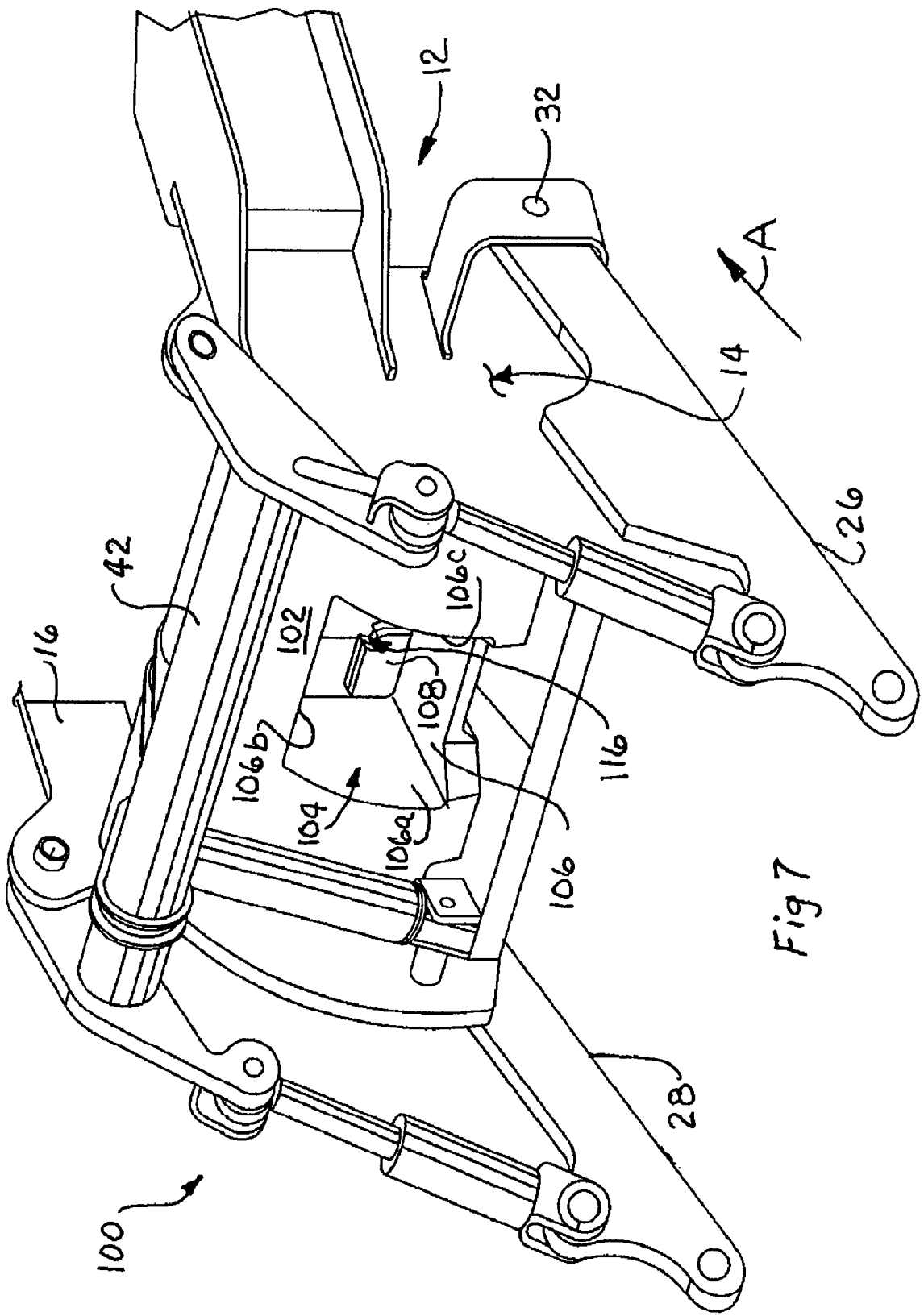
FIG. 7 is a partial perspective view of a rear end of a work machine representative of a tractor used for construction purposes, including an embodiment of a three point hitch and a sway restrictor of the present invention installed thereon, and showing an embodiment of a structural body disposed between structural elements of the work machine.
Figure 8:
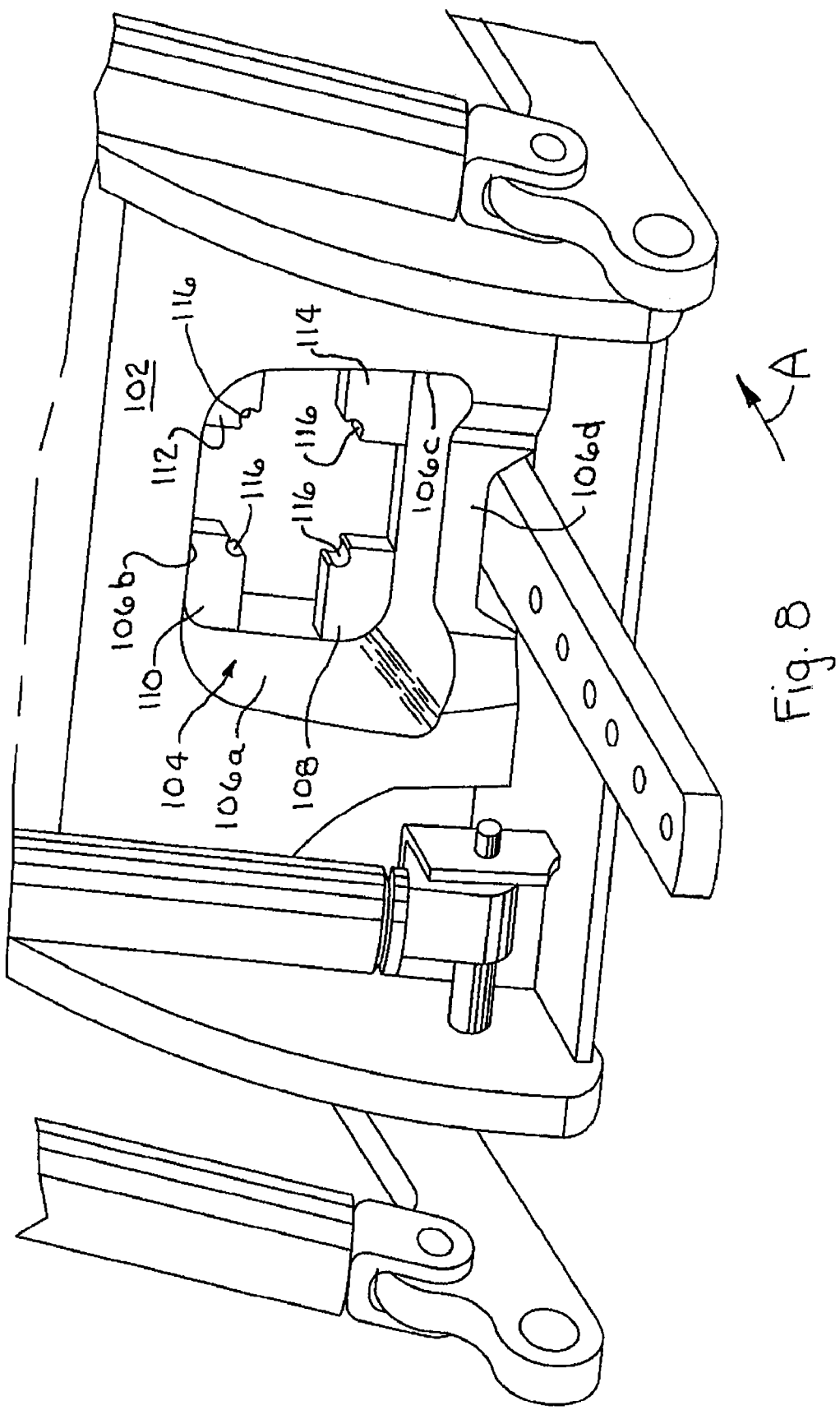
FIG. 8 is an enlarged partial perspective view of inner surfaces features of the structural body disposed between the three point hitch of the present invention

FIGS. 7-14 show an embodiment of work machine 100 that is otherwise similar to work machine 10 except as shown. More specifically, as shown in FIGS. 7 and 8 and FIG. 12, which is a partial perspective view reversed from FIGS. 7 and 8, a structural body 102 is disposed between structural elements 14 and 16. Structural body 102 can be welded, cast, bolted or secured to the rear frame 12 (FIG. 7). As shown, structural body 102 includes a recess 104 formed therein including inner surfaces 106a, 106b, 106c, 106d defining a rectangular opening, although other geometrically shaped openings are contemplated. Proceeding along direction A as indicated in FIG. 8, surfaces 106a, 106b, 106c, 106d extend to tabs 108, 110, 112, 114 (FIG. 8) spaced apart from each other and extending toward each other. As shown, each tab 108, 110, 112, 114 includes a slot 116 formed therein. In one embodiment, each of tabs 108, 110, 112, 114 are substantially identical. While four tabs are shown in FIG. 8, it is to be appreciated that there can be less than four tabs or more than four tabs and that the tabs can be different from each other.

Figure 10:
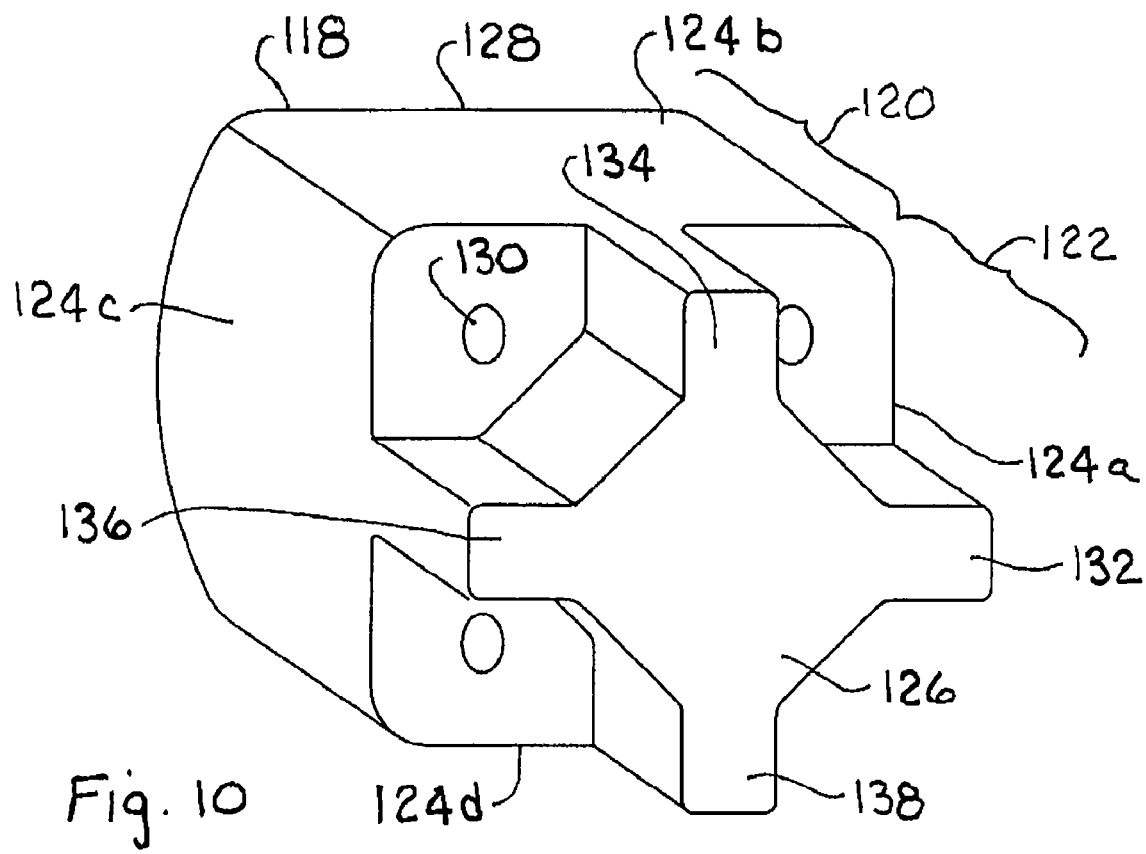
FIGS. 9 and 10 are reverse perspective views of an embodiment of a structural body of the present invention.
Figure 9:
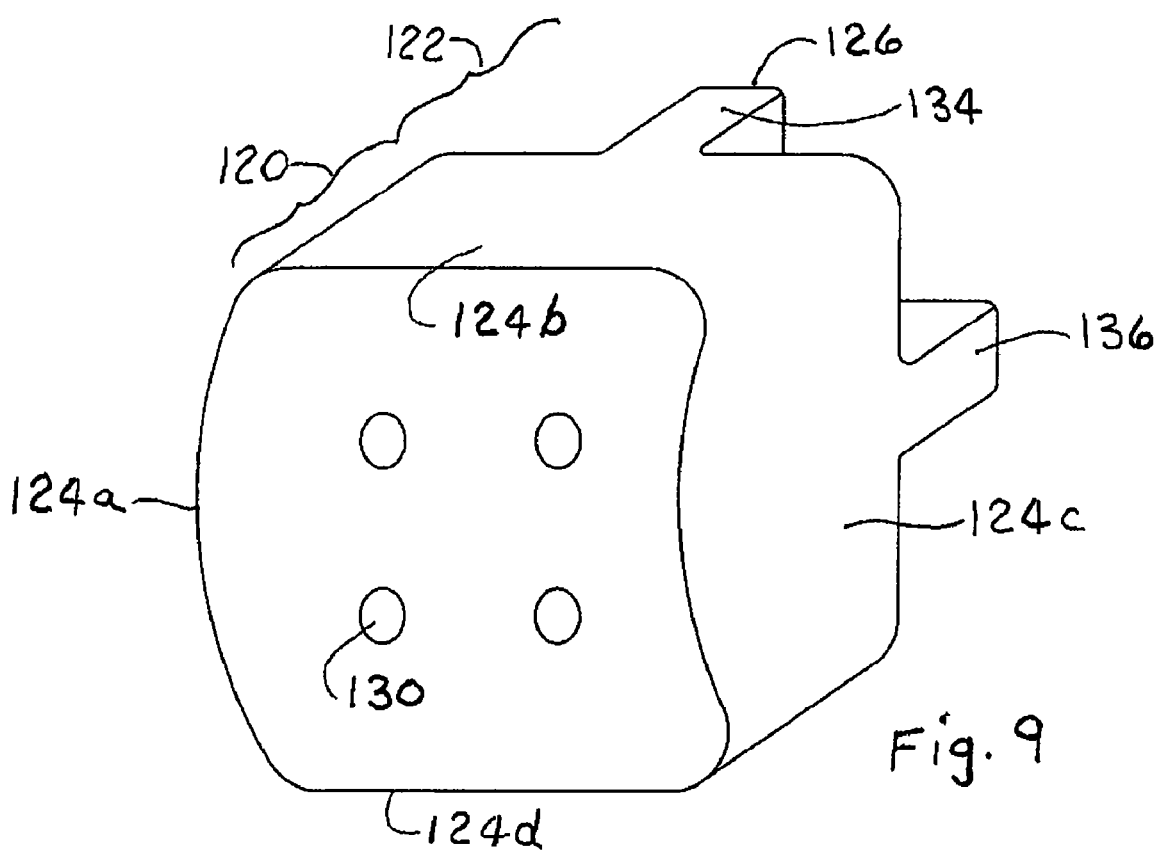

As shown in FIGS. 9 and 10 a counterweight 118 that is received in recess 104, as shown in FIGS. 11 and 12 is discussed. In an embodiment shown in FIGS. 9 and 10, counterweight 118 includes a first portion 120 and a second portion 122 and is of unitary construction. First portion 120 defines a block that is bounded by an end 128 and second portion 122, as well as by surfaces 124a, 124b, 124c, 124d. As shown, apertures 130 are formed in fluid communication between end 128 and second portion 122. Second portion 122 extends from the junction with first section 120 to end 126 and includes outwardly extending flanges 132, 134, 136, 138. In one embodiment, second portion 122 and flanges 132, 134, 136, 138 resemble a plus sign "+", although other arrangements are contemplated. That is, different numbers and/or arrangements of flanges and corresponding tabs and slots can be employed.

Counterweight 118 is received in recess 104 of structural body 102 by directing end 126 inside of the recess, past inner surfaces 106a-106d until the second portion 122 inserts between flanges 108, 110, 112, 114. That is, as shown in FIG. 12, flange 132 slides between tabs 108 and 110, flange 134 slides between tabs 110 and 112, flange 136 slides between tabs 112 and 114, and flange 138 slides between tabs 108 and 114. To maintain counterweight 118 in an installed position as shown in FIG. 12, a threaded fastener 144 is inserted from end 128 of counterweight 118 through aperture 130 and then through a corresponding slot 116. A washer 140 is slid over the end of threaded fastener 144 and a nut 142 is threadedly engaged with threaded fastener 144 to draw the corresponding portion of the juncture between the first and second portion of the counterweight 118 with the corresponding tab. As shown, one threaded fastener 144 is employed to engage with slots 116 of each of tabs 108, 110, 112, 114 to secure counterweight 118 in recess 104 of structural body 102. Alternately, locking bayonet pins or other fasteners can be used to engage slots 116 of tabs through corresponding apertures 130 in counterweight 118 to maintain counterweight 118 in the installed position in recess 104 of structural body 102.

In one embodiment, once counterweight 118 has been installed in structural body 102, surfaces 124a, 124b, 124c, 124d and corresponding surfaces 106a, 106b, 106c, 106d are maintained in close proximity therebetween. In addition, in one embodiment, flanges 132, 134, 136, 138 are maintained in close proximity between corresponding tabs 108, 110, 112, 114 as previously discussed. In one embodiment, the proximity between corresponding counterweight surfaces 106 and counterweight surfaces 124 and/or between flanges 132, 134, 136, 138 and corresponding tabs 108, 110, 112, 114 are maintained in sufficiently close proximity such that counterweight 118 provides structural support for structural body 102. Counterweight 118 is constructed of a suitable material of sufficient density and structural strength to provide structural support.

Figure 13:
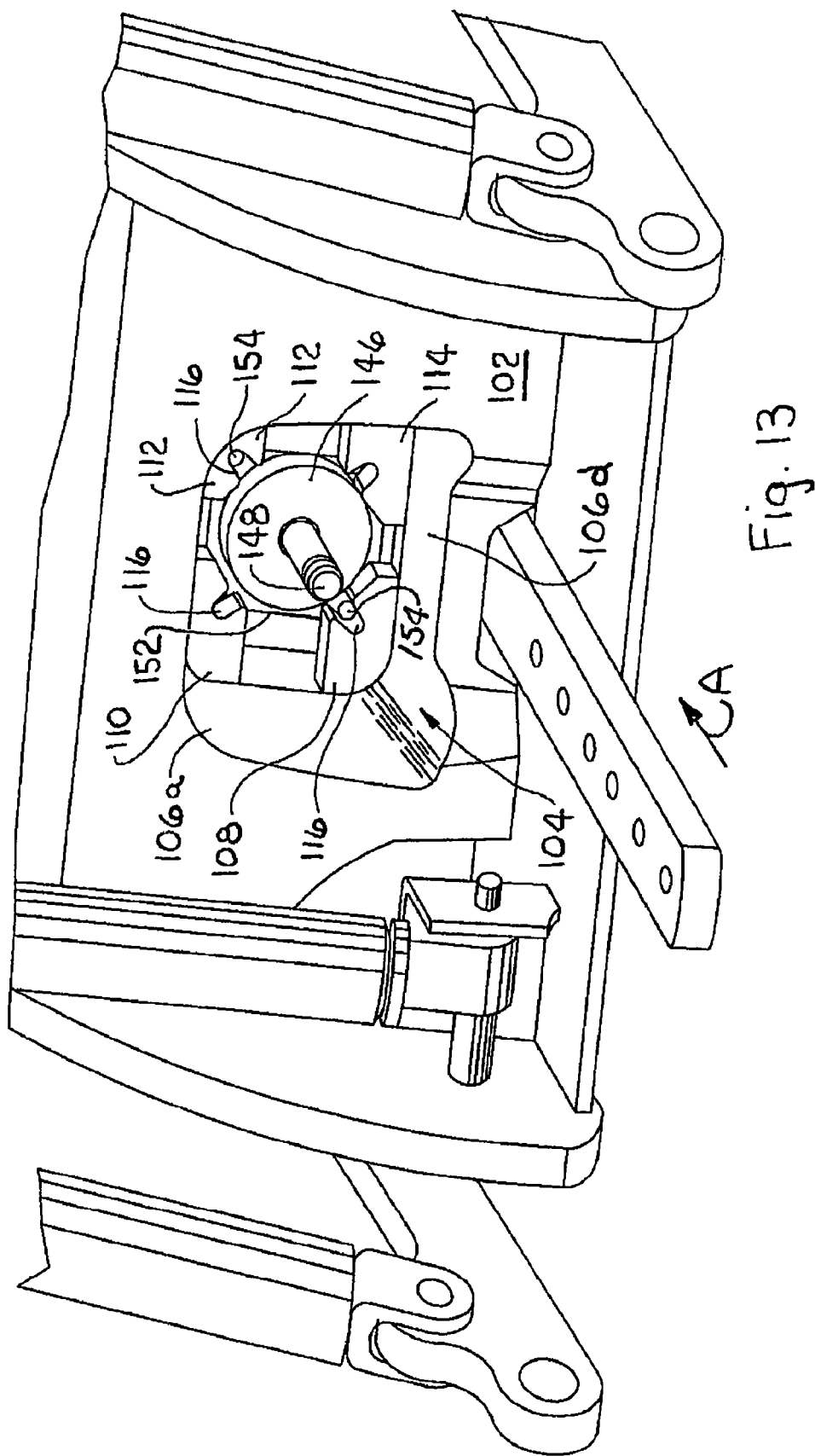
FIG. 13 is a partial perspective view of a rear end of a work machine representative of a tractor with an embodiment of a rotary motor installed in a recess of the structural body of the present invention.

In one embodiment, as shown in FIGS. 13 and 14, when counterweight 118 has been removed from recess 104, a rotary motor 146 can be interchangeably installed in recess 104. Rotary motor 146 includes a base 150 having a splined shaft 148 for rotatably driving an implement (not shown) such as a brush cutter or other implement requiring a rotational driving force provided by motor 146. A flange 152 extends outwardly from base 150. In one embodiment, apertures 154 formed in base 150 are aligned with slots 116 formed in tabs 108, 110, 112, 114 so that a threaded fastener, bayonet pin or other type of fastener (not shown) can engage a corresponding slot 116 and aperture 154 to secure rotary motor 146 in recess 104 of structural body 102. Rotary motor 146 can be powered by mechanical linkage, fluid power or any other suitable source capable of urging splined shaft 148 into rotary movement. In one embodiment, counterweight 118 and rotary motor 146 can be installed using the same slot 116 pattern.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A three point hitch for a work machine, comprising:
    an elongate substantially straight first draft link having a mounting end portion and a free end portion opposite the mounting end portion, the mounting end portion being mounted to a first side of a work machine to allow upward and downward pivotal movement of the free end portion beside an upwardly and downwardly extending fixed structural element of the work machine;
    an elongate substantially straight second draft link having a mounting end portion and a free end portion opposite the mounting end portion thereof, the mounting end portion of the second draft link being mounted to a second side of the work machine opposite the first side to allow upward arid downward pivotal movement of the free end portion of the second draft link, and
    a sway restrictor mounted on the free end portion of the first draft link and engaged with the upwardly and downwardly extending structural element so as to be movable upwardly and downwardly therealong during the upward arid downward pivotal movement of the free end portion of the first draft link while restricting sideward swaying thereof toward and away from the structural element; and
    a structural body disposed between the upwardly and downwardly extending fixed structural elements and the second draft link, the structural body includes a recess formed therein including inner surfaces defining an opening, the inner surfaces extending from a rear face of the structural body along a generally horizontal axis to an array of tabs spaced apart from each other; the recess configured to receive a counterweight therein, a first portion of the counterweight having flanges for sliding horizontal engagement within the spaces between the tabs of the structural body and a second portion of the counterweight having a profile located within a generally vertical plane, the profile of the counterweight corresponding to a vertical profile of the recess;
    wherein in a mounted position the second portion of the counter weight is in contact with the tabs and the flange is engaged between the tabs preventing further movement of the counterweight in a first horizontal direction, and the perimeter of the profile of the counterweight is encircled by the recess such that an outer surface around the profile of the counterweight is in close proximity to the perimeter of the interior surface of the structural body thereby providing structural support to the structural body.

2. The hitch of claim 1, wherein the free end portions of the first and second draft links are disposed to connect to category 1, 2 and 3 implements.

3. The hitch of claim 1, wherein the sway resister comprises:
    a generally C shaped bracket having a first leg portion and a second leg portion spaced from the first leg portion, the leg portions defining a space therebetween adapted for cooperatively receiving the upwardly and downwardly extending structural element of the work machine therein such that an inner surface of the first leg portion faces a first side of the structural element and an inner surface of the second leg portion faces a second side of the structural element opposite the first side, at least one of the leg portions having a passage therein extending in a transverse direction generally toward the other of the leg portions and in connection with the space;
    a wear pad disposed in the passage so as to be extendible in the transverse direction into the space; and
    an adjusting element disposed in connection with the wear pad and adjustably movable in cooperation with the wear pad for adjustably holding the wear pad in a position extending into the space, for restricting relative transverse movement of the first draft link and the structural element cooperatively received in the space.

4. The hitch of claim 3, wherein the adjusting element is adjustable via a change in fluid pressure.

5. The hitch of claim 3, wherein the adjusting element is adjustable via a change in a mechanical linkage.

6. The hitch of claim 1, wherein the counterweight is of unitary construction.

7. The hitch of claim 6, wherein the counterweight and a fluid motor are interchangeably mountable to the tabs of the structural body of the work machine, the counterweight configured for mounting to a first side of the tabs and the fluid motor, located forwardly of the tabs, configured for mounting to a second side of the tabs opposite the first side of the tabs, such that the shaft of the motor extends rearwardly from the motor into the recess, with respect to the direction of travel of the machine.

8. A work machine comprising:
a three point hitch comprising:
an elongate substantially straight first draft link having a mounting end portion and a free end portion opposite the mounting end portion, the mounting end portion being mounted to a first side of the work machine to allow upward and downward pivotal movement of the free end portion beside an upwardly and downwardly extending fixed structural element of the work machine;
an elongate substantially straight second draft link having a mounting end portion and a free end portion opposite the mounting end portion thereof, the mounting end portion of the second draft link being mounted to a second side of the work machine opposite the first side to allow upward and downward pivotal movement of the free end portion of the second draft link; and
a sway restrictor mounted on the free end portion of the first draft link and engaged with the upwardly and downwardly extending structural element so as to be movable upwardly and downwardly therealong during the upward and downward pivotal movement of the free end portion of the first draft link while restricting sideward swaying thereof toward and away from the structural element;
a structural body disposed between the upwardly and downwardly extending fixed structural element and the second draft link; and
the structural body having a recess defined by inner surfaces of the structural body and farming a geometrically shaped generally horizontal opening having an arrangement of tabs around the perimeter of an internal surface, the tabs configured to horizontally receive therein in a first configuration a correspondingly shaped counterweight, a first portion of the counter weight having a flange structure for sliding horizontally into spaces between the tabs of the structural body and the counterweight mounting to a first side of the tabs, and alternatively in a second configuration a rotary motor is mounted to a second side of the tabs opposite the first side, a shaft of the rotary motor extends rearward from the tabs and into the recess to drive an implement.

9. The machine of claim 8, wherein the counterweight is of unitary construction.

10. The machine of claim 9, wherein an outer surface encircling around a perimeter of a second portion of the counterweight is in close proximity to the a perimeter of the interior surface of the structural body upon insertion of the counterweight within the recess and provides structural support to the structural body; and
the second portion of the counterweight having a profile located within a generally vertical plane, the profile of the counterweight corresponding to a vertical profile of the recess wherein the counterweight is in a mounted position within the recess, the second portion of the counter weight is in contact with the tabs and the flange is engaged between the tabs preventing further movement of the counterweight in a first horizontal direction, and the perimeter of the profile of the counterweight is encircled by the recess such that an outer surface around the profile of the counterweight is in close proximity to a perimeter of the interior surface of the structural body thereby providing structural support to the structural body.

11. The machine of claim 8, wherein the counterweight includes a predetermined aperture arrangement for receiving mechanical fasteners for mounting the counterweight to the structural body.

12. The machine of claim 11, wherein the predetermined aperture arrangement for mounting the counterweight to the structural body is usable for mounting the rotary motor to the structural body.

13. The machine of claim 8, wherein the free end portions of the first and second draft links are disposed to connect to category 1, 2 and 3 implements.

14. The machine of claim 8, wherein the sway restrictor comprises:
a generally C shaped bracket having a first leg portion and a second leg portion spaced from the first leg portion, the leg portions defining a space therebetween adapted for cooperatively receiving the upwardly and downwardly extending structural element of the work machine therein such that an inner surface of the first leg portion faces a first side of the structural element and an inner surface of the second leg portion faces a second side of the structural element opposite the first side, at least one of the leg portions having a passage therein extending in a transverse direction generally toward the other of the leg portions and in connection with the space;
a wear pad disposed in the passage so as to be extendible in the transverse direction into the space; and
an adjusting element disposed in connection with the wear pad and adjustably movable in cooperation with the wear pad for adjustably holding the wear pad in a position extending into the space, for restricting relative transverse movement of the first draft link and the structural element cooperatively received in the space.

15. The hitch of claim 14, wherein the adjusting element is adjustable via a change in fluid pressure.

16. The hitch of claim 14, wherein the adjusting element is adjustable via a change in a mechanical linkage 17. A work machine comprising:
a three point hitch comprising:
an elongate substantially straight first draft link having a mounting end portion and a free end portion opposite the mounting end portion, the mounting end portion being mounted to a first side of the work machine to allow upward and downward pivotal movement of the free end portion beside an upwardly and downwardly extending fixed structural element of the work machine;
an elongate substantially straight second draft link having a mounting end portion and a free end portion opposite the mounting end portion thereof the mounting end portion of the second draft link being mounted to a second side of the work machine opposite the first side to allow upward and downward pivotal movement of the free end portion of the second draft link, and
a sway restrictor mounted on the free end portion of the first draft link and engaged with the upwardly and downwardly extending structural element so as to be movable upwardly and downwardly therealong during the upward and downward pivotal movement of the free end portion of the first draft link while restricting sideward swaying thereof toward and away from the structural element; and a structural body disposed between the upwardly and downwardly extending fixed structural element and the second draft link, the structural body having a generally horizontal recess extending through the body and defined by inner surfaces of the body, the inner surfaces forming a geometrically shaped opening configured to interchangeably receive both a counterweight and a rotary motor to drive an implement, wherein the recess extends to an arrangement of tabs, the tabs configured in a first configuration for generally horizontal sliding engagement with a first connecting portion of the counterweight, the counterweight mounting to a first side of the tabs, and alternatively in a second configuration connection to a rotary motor, the rotary motor including a base having an outwardly extending base flange the base flange mounted to the second side of the tabs opposite the firs side, a shaft of the rotary motor extends rearward through the base flange, and into the recess to drive an implement.

18. The machine of claim 17, wherein an outer surface is around a perimeter of a profile of the counterweight, located within a generally vertical plane, of a second portion of the counterweight is in close proximity to the interior surface of the structural body upon insertion of the counterweight within a correspondingly shaped encircling section of the recess and provides structural support to the structural body; and wherein the second portion of the counter weight in a mounted position is in contact with the tabs and the flange is engaged between the tabs preventing further movement of the counterweight in a first horizontal direction, and the perimeter of the profile of the counterweight is encircled by the recess such that an outer surface around the profile of the counterweight is in close proximity to a perimeter of the interior surface of the structural body thereby providing structural support to the structural body.

\* \* \* \* \*